| United States Patent [19] | [11] | 4,210,547 |
|---|---|---|
| Hirozawa et al. | [45] | Jul. 1, 1980 |

[54] HYDROXYBENZOIC ACID AS PH BUFFER AND CORROSION INHIBITOR FOR ANTIFREEZE CONTAINING AMINOSILICONE-SILICATE POLYMERS

[75] Inventors: Stanley T. Hirozawa, Birmingham, Mich.; Edward F. O'Brien, Cromwell, Conn.; Joe C. Wilson, Belleville, Mich.

[73] Assignee: BASF Wyandotte Corporation, Wyandotte, Mich.

[21] Appl. No.: 348

[22] Filed: Jan. 2, 1979

[51] Int. Cl.$^2$ .............................................. C09K 15/32
[52] U.S. Cl. ........................................ 252/76; 252/73; 252/75; 252/77; 252/78.1; 252/78.3; 252/389 R; 252/396; 422/14; 422/7; 422/17
[58] Field of Search ...................... 252/75, 76, 77, 73, 252/78.1, 78.3, 389 R; 422/14, 7, 13, 17

[56] References Cited

U.S. PATENT DOCUMENTS

| 2,094,564 | 9/1937 | Schench et al. ...................... 252/73 |
| 3,203,969 | 8/1965 | Pines et al. ........................ 252/75 X |

*Primary Examiner*—Mayer Weinblatt
*Attorney, Agent, or Firm*—Andrew E. Pierce

[57] ABSTRACT

This invention relates to single-phase antifreeze or coolant concentrates comprising an alcohol, an aminosilicone-silicate copolymer and an organic basic buffer and corrosion inhibitor comprising a hydroxybenzoic acid or mixtures thereof. The concentrates are preferably used as coolants either undiluted or upon dilution with about 25 to about 90 percent by weight of water based upon the total weight of the concentrate. The alcohol is preferably ethylene glycol. The coolant compositions are effective in providing protection against corrosion of all metals and alloys used in industrial heat exchangers and are especially effective in inhibiting the corrosion of aluminum internal combustion engine and radiator components.

4 Claims, No Drawings

HYDROXYBENZOIC ACID AS PH BUFFER AND CORROSION INHIBITOR FOR ANTIFREEZE CONTAINING AMINOSILICONE-SILICATE POLYMERS

BACKGROUND OF THE INVENTION

1. Field of the Invention

This invention relates to alcohol based antifreeze and coolant compositions containing corrosion inhibitors for use primarily in water-circulating systems such as internal combustion engines, heat exchangers, cooling towers, and the like.

2. Description of the Prior Art

Antifreeze concentrates containing alcohols such as ethylene glycol are commonly diluted with water to prepare cooling system compositions for internal combustion engines in order to depress the freezing point of water. It is known that the alcohols utilized gradually decompose in the cooling system to produce acidic products which lower the pH of the coolant. It is also known that metallic surfaces in internal combustion engines which are in contact with such coolants become seriously corroded and that the corrosion becomes progressively worse as the pH of the coolant decreases. The recent tendency toward the use of aluminum in internal combustion engines, for instance, aluminum cylinder heads, aluminum water pumps and aluminum radiator cores, requires improved corrosion resistant antifreeze compositions which are capable of retarding the corrosion of metals which are in contact with such coolants.

It has also been recognized in the art that corrosion resistant antifreeze compositions are most desirably single-phase systems which have good shelf stability such that when such concentrates reach the consumer prior to dilution with water to form the coolant composition, such compositions contain the proper proportion of each phase and exhibit no gelation.

Numerous antifreeze compositions are known in the art which contain corrosion inhibitors and inhibitors for preventing decomposition of the alcohol utilized, for instance, ethylene glycol. These corrosion inhibitors and stabilizers for alcohol decomposition include both organic materials and inorganic materials. Illustrative of the organic materials that have been used in antifreeze compositions are guanadine, citrates, coal tar derivatives, petroleum bases, thiocyanates, peptones, phenols, thioureas, tannin, quinoline, morpholine, triethanolamine tartrates, glycol mono-recinoleate, organic nitrites, mercaptans, sulfonated hydrocarbons, fatty oils, triazoles, mercaptobenzothiazoles, phenothiazine, and piperazine. Illustrative of the inorganic materials that have been used as corrosion inhibitors are sulfates, sulfides, fluorides, hydrogen peroxide, alkali metal chromates, nitrites, phosphates, borates, tungstates, molybdates, carbonates, and silicates.

Silicates, particularly alkali metal silicates and certain silicones and silicate-silicone copolymers, have been suggested for use in antifreeze compositions to retard the corrosion of metal surfaces of internal combustion engines as disclosed in U.S. Pat. Nos. 3,341,469; 3,337,496; 3,312,622; 3,198,820; 3,203,969; 3,248,329; 3,265,623; 3,121,692; and others. While it has been found that compositions containing metal silicates are effective corrosion inhibitors for metals in internal combustion engines, especially aluminum, the use of metallic silicates in antifreeze compositions is disadvantageous since these compositions have poor shelf life and/or use life, that is, a tendency to gel and form precipitates on standing prior to dilution of antifreeze concentrates by the consumer or during use as a coolant. With respect to the water-soluble organo-silicones and water-soluble silicate-silicone copolymers which have been suggested for use in antifreeze compositions, it has been found that it would be desirable in such systems if greater reserve alkalinity could be incorporated into the system thereby reducing the corrosion tendency.

In U.S. Pat. No. 2,832,742, there is disclosed an ethylene glycol base coolant for use in automobile radiators containing a corrosion inhibiting composition composed of equal parts of para tertiary butyl benzoic acid and a high molecular weight aliphatic carboxylic acid derived from a petroleum fraction. In U.S. Pat. No. 2,197,774 there is disclosed the use of aromatic nitrohydroxy compounds wherein the nitro and hydroxy groups are directly attached to the aromatic nucleus or positioned only on a side chain. In Canadian Pat. No. 990,060 there is disclosed ethylene glycol based antifreeze compositions containing alkali metal silicates and alkali metal nitrites as corrosion inhibitors which are buffered at a pH of about 9 to about 10.5. There is no indication in any of these references that a hydroxybenzoic acid such as para hydroxybenzoic acid or mixtures thereof are effective pH buffers and corrosion inhibitors in such systems.

SUMMARY OF THE INVENTION

There are disclosed single-phase antifreeze and coolant concentrates comprising an alcohol selected from the group consisting of methanol, ethanol, propanol, ethylene glycol, diethylene glycol, triethylene glycol, propylene glycol and glycerol and a corrosion inhibiting amount of a water-soluble aminosilicone-silicate polymer, and, as an organic pH buffer, a hydroxybenzoic acid or mixtures thereof.

Preferably said alcohol is ethylene glycol and preferably the antifreeze concentrates are utilized as coolants upon dilution with water in internal combustion engines including those engines containing aluminum parts, for instance, aluminum cylinder heads. By the incorporation of the hydroxybenzoic acid of the invention into antifreeze compositions containing aminosilicone-silicate copolymers, the tendency for the system to suffer a loss in reserve alkalinity can be overcome. The organic pH buffers of the invention are especially advantageous as compared to the inorganic sodium borates and potassium borates.

DESCRIPTION OF THE PREFERRED EMBODIMENTS

The compositions of this invention contain a novel corrosion inhibiting organic basic buffer which is a hydroxybenzoic acid or mixture thereof, preferably para hydroxybenzoic acid. The ortho and meta forms as well as the dihydroxy benzoic acids, i.e., 2,6- and 2,4-dihydroxybenzoic acids. The use of such buffers serves to maintain the pH of the antifreeze or coolant composition above a pH of about 9 to about 11, preferably a pH above about 9.5 to 10.5 in order to minimize corrosion which increases with the decreasing pH of the antifreeze system. Additionally, where a water-soluble aminosilicone-silicate copolymer is utilized as a component of the antifreeze composition, the buffering of the pH by the hydroxybenzoic acid compounds of the invention serves to maintain reserve alkalinity of the system. While many basic buffers have been used in the past in antifreeze compositions to maintain the pH above 7, the borate salt buffers preferred in the prior art antifreeze compositions such as sodium tetraborate, sodium orthoborate, and sodium metaborate are ineffective in maintaining reserve alkalinity during use where the antifreeze composition contains water-soluble aminosiloxane-silicate polymers.

The amount of the hydroxybenzoic acid basic pH buffer utilized in the compositions of the invention depends to some extent upon the desired shelf life of the antifreeze concentrate containing the buffer, the effectiveness of the particular hydroxybenzoic acid selected, and the proportions of the other components of the antifreeze concentrate composition. Generally, amounts of the hydroxybenzoic acid compositions of the invention range from about 0.1 percent to about 1.5 percent by weight, preferably about 0.5 percent to about 1.2 percent by weight based upon the weight of the antifreeze concentrates of the invention. The use of lesser amounts of the buffers of the invention can result in a significant decrease in the pH of the coolant in a relatively short use time whereas the use of greater amounts of the buffer can involve the expenditure of needless amounts of money and possibly lead to insolubility problems. No advantage is generally gained by departing from the indicated proportions or from the use of additional basic buffer materials known in the prior art.

The alcohols that are suitable for use in preparing the antifreeze and cooling compositions of the invention include both monohydric alcohols and polyhydric alcohols. Thus, methanol, ethanol, and propanol as well as ethylene glycol, diethylene glycol, triethylene glycol, propylene glycol and glycerol are useful. Mixtures of these alcohols are also useful in the compositions of this invention. Ethylene glycol is an especially useful alcohol. The alcohol and coolant concentrates of the invention are useful as a heat transfer medium in the cooling systems of internal combustion engines both undiluted or upon dilution with relatively large amounts of water. The antifreeze concentrates of the invention are adapted to economical shipment and storage; the concentrate being shipped to the point where it is to be used in diluted form as a coolant. Water imparts desirable properties to both the concentrate and coolant compositions of the invention since small amounts of water tend to lower the freezing point of the concentrate composition and large amounts of water improve the heat transfer properties of the coolant compositions. The antifreeze concentrate compositions of the invention can contain about 0.1 percent by weight to about 10 percent by weight of water based upon the weight of the concentrate. The concentrates preferably contain about 1 to about 5 percent of water based upon the weight of the concentrate. Generally the coolant compositions contain about 25 percent to about 90 percent by weight of water based upon the total weight of the concentrate. The pH of both the antifreeze concentrate compositions of the invention and the coolants diluted with the above larger amounts of water generally should be maintained at greater than about 9 to about 11 in order that corrosion of metals with which the compositions come in contact will be minimized. Any alkali such as the alkali metal hydroxides can be used to adjust pH.

Various additives known in the prior art can be added to the antifreeze concentrate compositions of the invention or to the coolant compositions in order to impart special properties thereto. For instance, antifoam agents, identifying dyes, pH indicators, conventional corrosion and alcohol or glycol oxidation inhibitors known in the prior art, sealants which prevent leakage of the coolant from the coolant system, anticreep agents which prevent seepage of the coolant into the crackcase of the internal combustion engine and the like can be added to either or both the antifreeze concentrates of the inventions or the diluted coolant compositions of the invention. It should be noted that, while the antifreeze and coolant compositions of this invention are single-phase compositions, the addition of various additives insoluble in the alcohol or in water can render these compositions two-phase (for instance, the addition of an insoluble sealant additive which prevents leakage of the coolant from the cooling system). While the antifreeze concentrates and coolant compositions of this invention are particularly suitable for use either alone or upon dilution with water as coolants suitable for use in the cooling system of an internal combustion engine, the compositions can be advantageously employed in other applications such as heat transfer fluids or hydraulic fluids.

Aminosilicone-silicate copolymers useful in the antifreeze concentrates of the invention are the aminosilicone-silicate copolymers prepared, by the reaction of an aminosiloxane with an alkali metal silicate. These copolymers are used in a corrosion inhibiting amount and preferably are present in said concentrates in the amount of from 0.1 percent to 10 percent by weight based upon the weight of said concentrate and consists essentially of:

(A) from 0.1 to 99.9 parts by weight of siloxane groups represented by the formula:

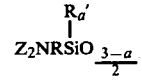

wherein Z is a member selected from the group consisting of the hydrogen atom, the unsubstituted monovalent hydrocarbon groups, and substituted monovalent hydrocarbon groups containing from 0 to 1 hydroxy group as a substituent and from 0 to 1 amino group as a substituent; R is an unsubstituted divalent hydrocarbon group containing at least three carbon atoms; the $Z_2N$ group is attached to at least the third carbon atom removed from the silicon atom; R' is an unsubstituted monovalent hydrocarbon group and a has a value from 0 to 2 inclusive and (B) from 0.1 to 99.9 parts by weight of groups represented by the formula:

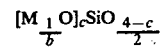

wherein M is a cation that forms a water-soluble silicate selected from the group consisting of sodium, potassium, lithium, rubidium and tetra-organoammonium cations; b is the valence of the cation represented by M and has a value of at least one and c has a value from 1 to 3 inclusive.

The inhibited antifreeze compositions of this invention are particularly suitable for use in the cooling systems of internal combustion engines to provide protection against corrosion of cooling system components composed of iron, brass, copper, and especially aluminum together with the alloys of these metals. During use as a coolant in an internal combustion engine, the antifreeze compositions of the invention retain their reserve alkalinity to a surprising extent in comparison with antifreeze compositions of the prior art. Thus, the life of the coolant during which corrosion protection is maintained is substantially extended over those compositions of the prior art.

Representative examples of the aminosilicone-silicate copolymers together with methods for their preparation can be found in U.S. Pat. No. 3,203,969 and U.S. Pat. No. 3,248,329, both incorporated herein by reference.

The reserve alkalinity of an antifreeze composition as referred to elsewhere in the specification is defined as a measure of the ability of the antifreeze composition to resist or decrease in pH due to the presence of acidic materials such as are produced by the decomposition of ethylene glycol. Reserve alkalinity is determined by titrating a sample (about 10 cc) of the composition with 0.1 Normal aqueous hydrochloric acid solution. The reserve alkalinity is computed by calculating the number of milliliters of acid that would be required to neutralize 100 milliliters of the composition from the number of milliliters of acid actually required to neutralize the sample.

When not otherwise specified throughout this specification and claims, temperatures are given in degrees centigrade and parts, percentages and proportions are by weight.

The embodiments of the invention in which an exclusive property or privilege is claimed are defined as follows:

1. A single-phase antifreeze and coolant concentrate consisting essentially of an alcohol, an aminosilicone-silicate polymer corrosion inhibitor, and a hydroxybenzoic acid pH buffer and corrosion inhibitor wherein said pH buffer is present in an amount of about 0.1 percent to about 1.5 percent by weight and said polymer corrosion inhibitor is present in an amount of from 0.1 percent to 10 percent by weight all based upon the weight of said concentrate and consists essentially of:

(A) from 0.1 to 99.9 parts by weight of siloxane groups represented by the formula:

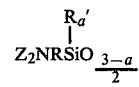

wherein Z is a member selected from the group consisting of the hydrogen atom, unsubstituted monovalent hydrocarbon groups, and substituted monovalent hydrocarbon groups containing from 0 to 1 hydroxy group as a substituent and from 0 to 1 amino group as a substituent; R is an unsubstituted divalent hydrocarbon group containing at least three carbon atoms; the $Z_2N$ group is attached to at least the third carbon atom removed from the silicon atom; R' is an unsubstituted monovalent hydrocarbon group and a has a value from 0 to 2 inclusive and (B) from 0.1 to 99.9 parts by weight of groups represented by the formula:

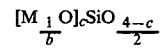

wherein M is a cation that forms a water soluble silicate selected from the group consisting of sodium, potassium, lithium, rubidium and tetraorganoammonium cations; b is the valence of the cation represented by M and has a value of at least one and c has a value from 1 to 3 inclusive and wherein said alcohol is selected from the group consisting of at least one of ethanol, methanol, propanol, ethylene glycol, diethylene glycol, triethylene glycol, propylene glycol and glycerol and said pH buffer and corrosion inhibitor is selected from the group consisting of ortho or para hydroxybenzoic acid and mixtures thereof.

2. The composition of claim 1 wherein said hydroxybenzoic acid pH buffer is para hydroxybenzoic acid and said alcohol is ethylene glycol.

3. The composition of claim 2 wherein M is sodium or potassium or mixtures thereof and wherein said composition contains, as an additional component, about 0.1 percent to about 10 percent of water based upon the weight of said concentrate.

4. A coolant composition comprising the composition of claim 3 and, as an additional component, about 25 to 90 percent by weight of water based upon the total weight of said concentrate.

* * * * *